(12) United States Patent
Huang

(10) Patent No.: US 8,871,411 B2
(45) Date of Patent: Oct. 28, 2014

(54) METHOD FOR MANUFACTURING WAVEGUIDE LENS

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/737,911

(22) Filed: Jan. 9, 2013

(65) Prior Publication Data

US 2014/0170568 A1   Jun. 19, 2014

(30) Foreign Application Priority Data

Dec. 19, 2012   (TW) .............................. 101148312 A

(51) Int. Cl.
*G03F 7/20* (2006.01)
*G02B 6/124* (2006.01)

(52) U.S. Cl.
USPC ........................................................... 430/7

(58) Field of Classification Search
None
See application file for complete search history.

(56) References Cited

U.S. PATENT DOCUMENTS 4,418,980 A * 12/1983 Keil et al. ..................... 385/1

FOREIGN PATENT DOCUMENTS

JP   59-069732 A * 4/1984

* cited by examiner

*Primary Examiner* — John A. McPherson
(74) *Attorney, Agent, or Firm* — Novak Druce Connolly Bove + Quigg LLP

(57) ABSTRACT

A method for manufacturing a waveguide lens is provided. A planar waveguide is provided, wherein the planar waveguide includes a top surface and a side surface perpendicularly connecting with the top surface, the side surface is coupled to a laser light source, and the laser light source emits a laser beam having a divergent angle and an optical axis substantially perpendicular to the side surface. A media film grating is formed on the top surface. The media film grating is made of a high refractive index material. The media film grating includes a plurality of parallel media film strips, each of which is substantially perpendicular to the side surface. A pair of strip-shaped electrodes is formed on the top surface and is arranged at opposite sides of the media film grating and the optical axis. The pair of strip-shaped electrodes is substantially parallel to the media film strips.

5 Claims, 8 Drawing Sheets

METHOD FOR MANUFACTURING WAVEGUIDE LENS

BACKGROUND

1. Technical Field

The present disclosure relates to integrated optics, and particularly to a method for manufacturing a waveguide lens.

2. Description of Related Art

Lasers, when used as light sources in integrated optics, have excellent directionality, as compared to other light sources. However, laser beams emitted by the lasers do still have a divergence angle. As such, if the laser is directly connected to an optical element, some divergent rays may not be able to enter into the optical element, decreasing light usage.

Therefore, it is desirable to provide a method for manufacturing a waveguide lens, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
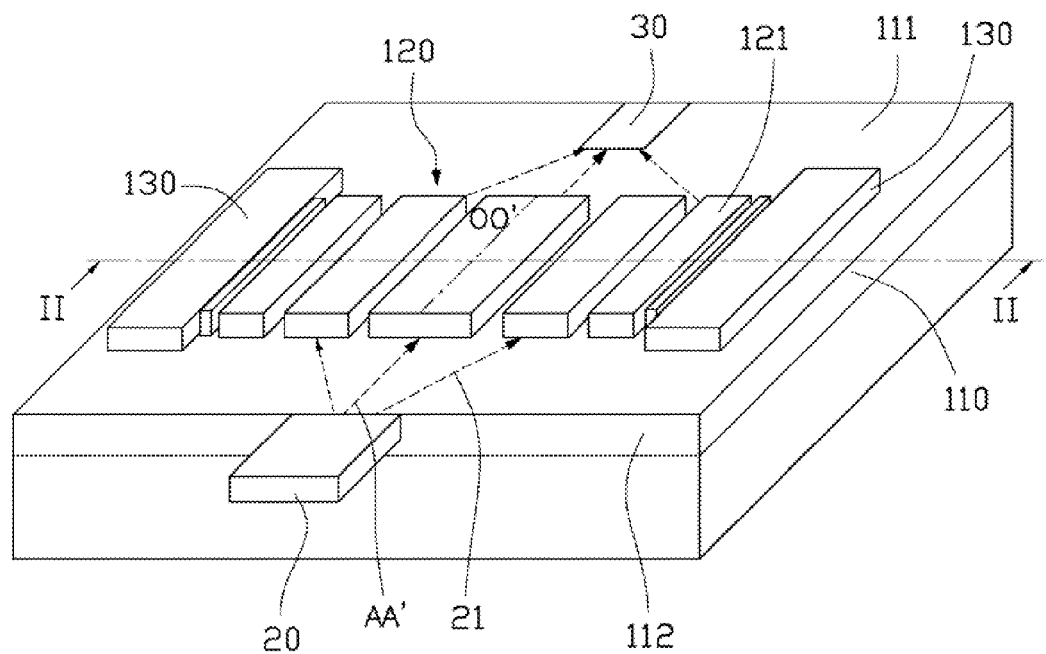
FIG. 1 is an isometric schematic view of a waveguide lens, according to an embodiment.
Figure 2:
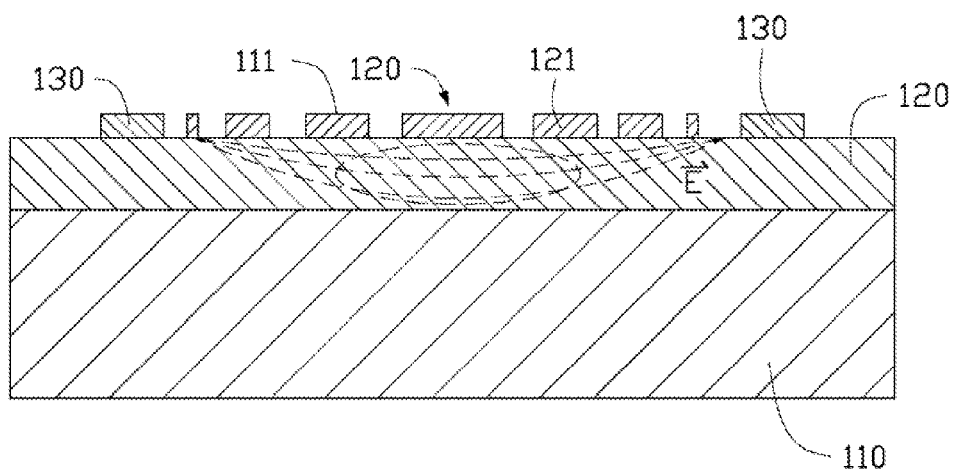
FIG. 2 is a cross-sectional view taken along a line II-II of FIG. 1.

Referring to FIGS. 1-2, a method for manufacturing a waveguide lens 10, according to an embodiment, includes the following steps S01-S03.

In step S01, a planar waveguide 110 is provided. The planar waveguide 110 includes a top surface 111 and a side surface 112 perpendicularly connecting with the top surface 111. The side surface 112 is coupled to a laser light source 20. The laser light source 20 emits a laser beam 21 having a divergent angle and an optical axis AA' substantially perpendicular to the side surface 112.

In step S02, a media film grating 120 is deposited on the top surface 111 using a high refractive material, such as a polymer with a high refractive index. The media film grating 120 includes a number of parallel media film strips 121, each of which is substantially perpendicular to the side surface 112.

In step S03, a pair of strip-shaped electrodes 130 is formed on the top surface 111, and arranged at opposite sides of the media film grating 120 and equidistantly from the optical axis AA'. The electrodes 130 are substantially parallel with the media film strips 121.

Each media film strip 121 and the planar waveguide 110 cooperatively form a strip-loaded waveguide. An effective refractive index of portions of the planar waveguide 110 where each media film strip 121 is located (i.e., a portion of the planar waveguide 110 beneath each media film strip 121) increases. As such, by properly constructing the media film grating 120, for example, constructing the media film grating 120 as a chirped grating, the media film grating 120 and the planar waveguide 110 can function as, e.g., a chirped diffractive waveguide lens. By virtue of the electrodes 130 and the accompanying modulating electric field $\vec{E}$, the effective focal length of the diffractive waveguide lens can be adjusted as desired to effectively converge the laser beam 21 into an optical element 30, no matter how far away the optical element 30 may be.

Figure 3:
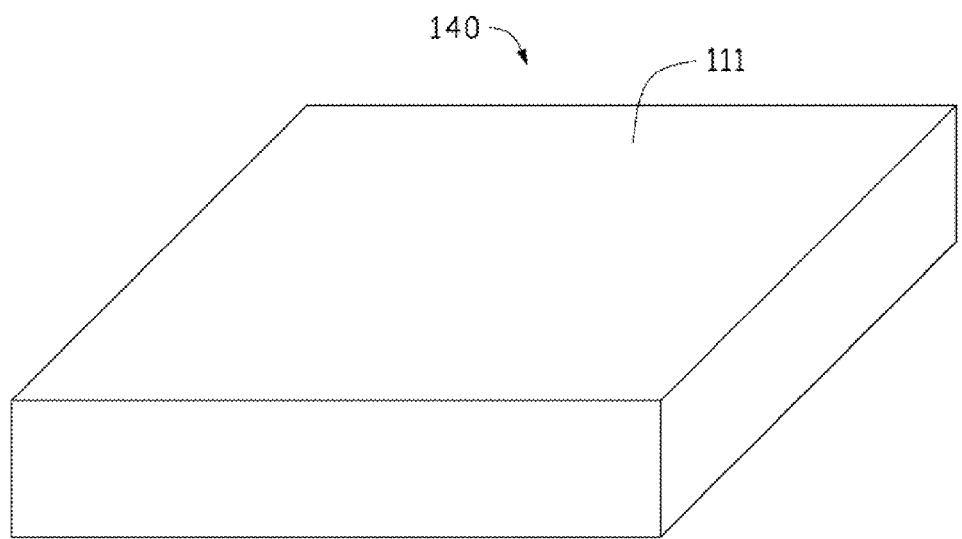
FIGS. 3-8 are schematic views showing how a method for manufacturing a waveguide lens is implemented, according to another embodiment.
Figure 4:
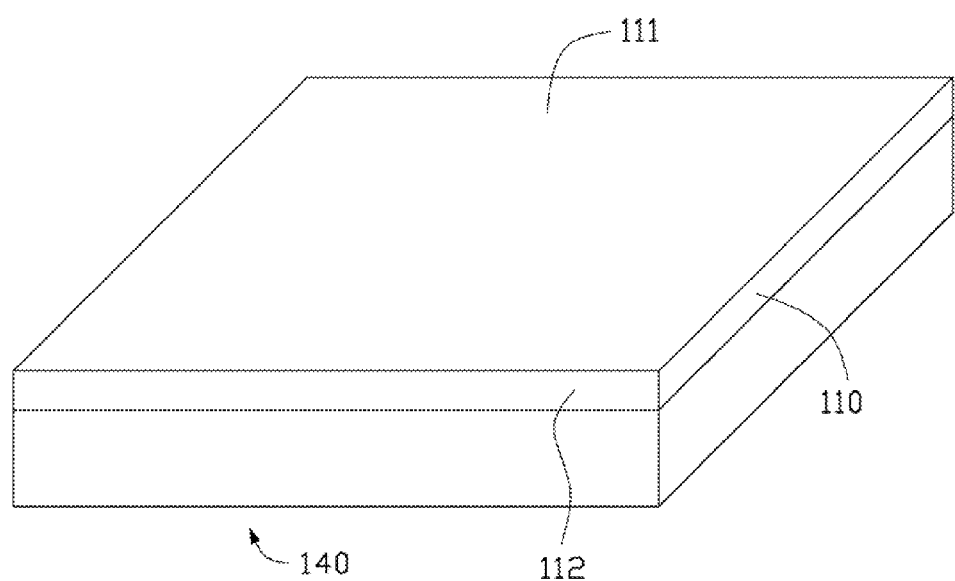

Referring to FIGS. 3-4, the step S01 includes the following sub-steps S011-S013.

In sub-step S011, a substrate 140 is provided. The substrate 140 includes the top surface 111 and a side surface coplanar with the side surface 112. In this embodiment, the substrate 110 is made of lithium niobate ($LiNbO_3$) crystal.

In sub-step S012, a layer of titanium is deposited on the top surface 111 by evaporation process or by sputtering deposition technology or similar process.

In sub-step S013, the titanium is diffused into the top surface 111 by a high temperature diffusion technology. That is, the planar waveguide 110 is made of $LiNbO_3$ diffused with Ti (Ti: $LiNbO_3$), and the effective refractive index gradually changes across the media film strips 121, benefiting the creating of the diffractive waveguide lens. After the planar waveguide 110 is formed, the top surface 111 becomes the upper surface of the planar waveguide 110.

Figure 5:
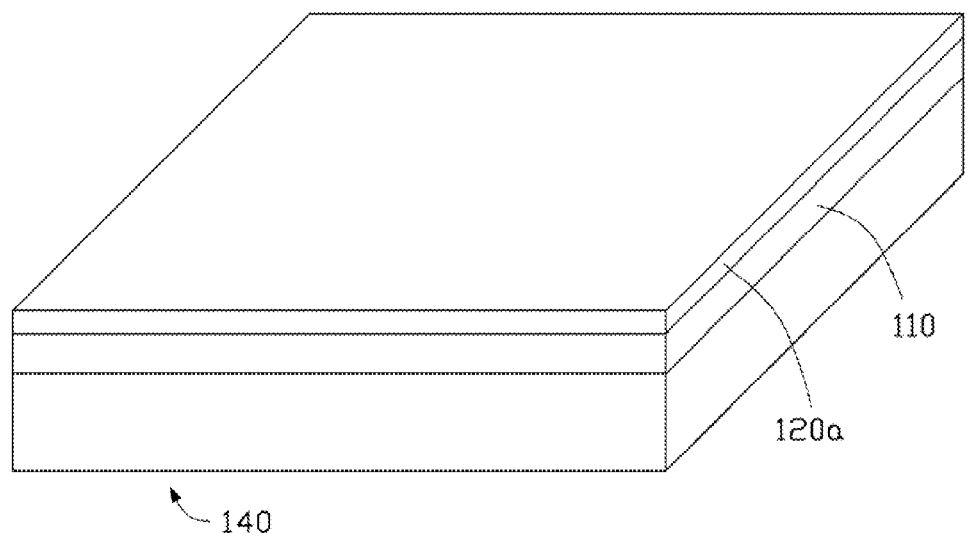
Figure 6:
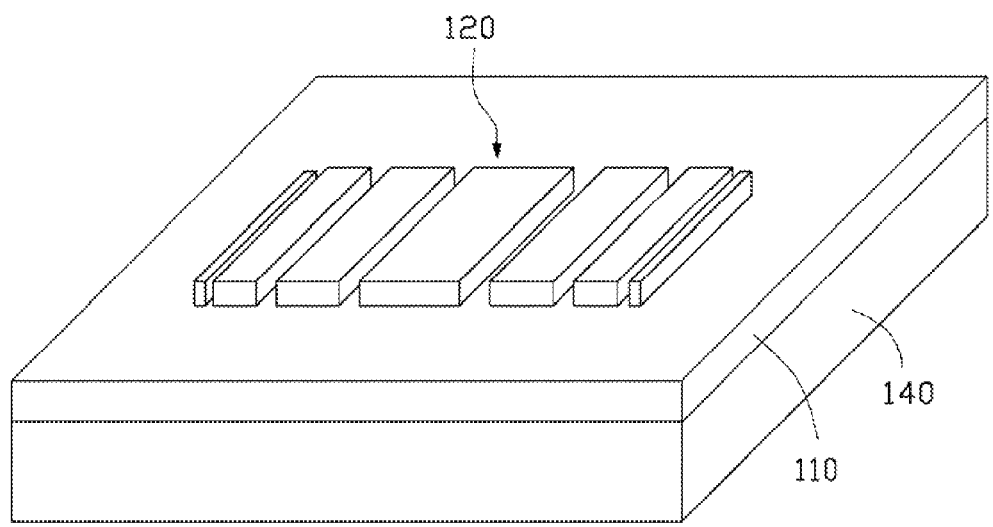

Referring to FIGS. 5-6, the step S02 can include the following sub-steps S021-S022.

In sub-step S021, a high refractive index film 120a is formed on the top surface 111 by, for example, spin coating. The high refractive index film 120a is made of photo-resist material.

In sub-step S022, the media film grating 120 is formed by exposing and developing the high refractive index film 120a using photolithography technology.

The media film grating 120 is a chirped grating in this embodiment. There are an odd number of the media film strips 131, since the central axis OO' passes through a single central media film strip 131 (hereinafter the central media film strip 131), and there are an even number of side media film strips 131 (hereinafter the side media film strips 131) on each side of the central media film strip 131. All the media film strips 131, including one half of the central media film strip 131, are symmetrical about the central axis OO' of the media film grating 120. Each of the media film strips 131 is rectangular and parallel with the others. In a sideways direction from the central axis OO', widths of the media film strips 131 decrease, and widths of gaps between each two adjacent media film strips 131 also decrease.

Figure 7:
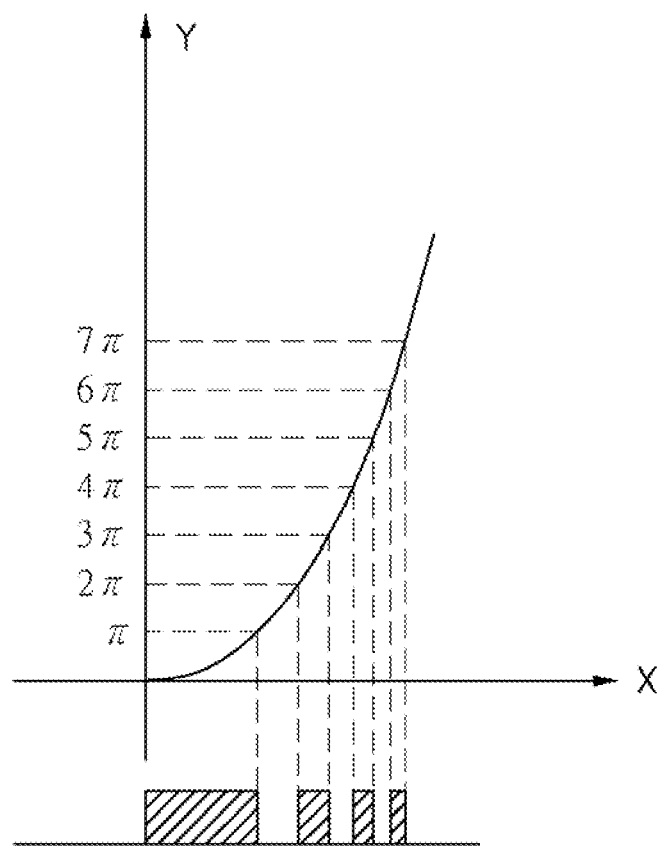

Referring to FIG. 7, a coordinate system "oxy" is established, wherein the origin "o" is an intersecting point of the central axis OO' and a widthwise direction of the planar waveguide 110, "x" axis is the widthwise direction of the planar waveguide 110, and "y" axis is a phase shift of the laser beam 21 at any point on the "x" axis. According to wave theory of planar waveguides, $y=a(1-e^{kx^2})$, wherein x>0, a e, and k are constants. In this embodiment, boundaries of the media film strips 131 conform to conditions of the formulae: $y_n=a(1-e^{kx_n^2})$ and $y_n=n\pi$, wherein $x_n$ is the nth boundary of the media film strips 131 along the "x" axis, and $y_n$ is the corresponding phase shift. That is, $$x_n = \sqrt{\frac{\ln\left(1-\frac{n\pi}{a}\right)}{k}} \quad (x_n > 0).$$

The boundaries of the media film strips 131 are where $x_n<0$ can be determined by characteristics of symmetry of the media film grating 120.

Figure 8:
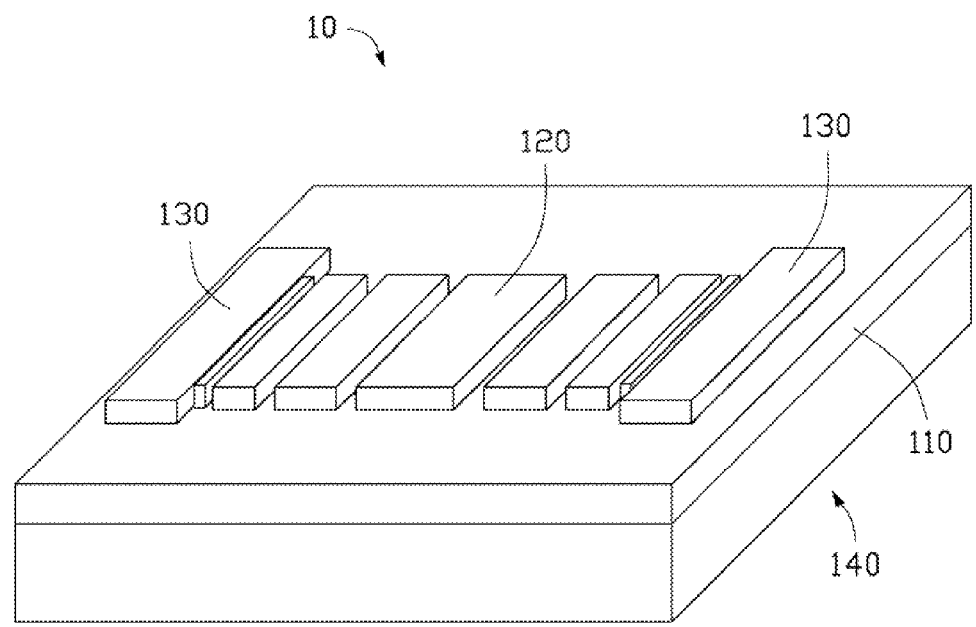

Referring to FIGS. 1, 2, and 8, the electrodes 130 are also symmetrical about the central axis OO' and are substantially in line with, and parallel to, the media film strips 131. A length of each of the electrodes 130 is at least equal to a length of the media film grating 130, and a height of each of the electrodes 130 is at least equal to a height of the media film strips 131 of the media film grating 130. As such, the modulating electric field $\vec{E}$ can effectively modulate the effective refractive index of the planar waveguide 120 through which the light beam 21 passes.

The laser light source 20 is a distributed feedback laser, and is attached to a portion of the side surface 112 corresponding to the planar waveguide 110. The optical axis AA' is aligned with or vertically below the widthwise central axis OO'.

The optical element 30 can be a strip waveguide, an optical fiber, or a splitter.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A method for manufacturing a waveguide lens, the method comprising:
   providing a planar waveguide, wherein the planar waveguide comprising a top surface and a side surface perpendicularly connecting the top surface, the side surface is configured for coupling to a laser light source, and the laser light source emits a laser beam having a divergent angle and an optical axis substantially perpendicular to the side surface;
   depositing a media film grating on the top surface, the media film grating made of a high refractive index material, wherein the media film grating comprises a plurality of parallel media film strips, each of which is substantially perpendicular to the side surface, the step of depositing the media film grating comprises:
      forming a high refractive index film on the top surface by spin coating, wherein the high refractive film is made of photo-resist material; and
      forming the media film grating by exposing and developing the high refractive index film using photolithography technologies to form the media film grating; and
   forming a pair of strip-shaped electrodes on the top surface, wherein the electrodes are arranged at opposite sides of the media film grating and the optical axis, and substantially parallel with the media film strips;
   wherein the media film grating comprises a plurality of media film strips, the number of the media film strips is odd, the media film strips are symmetrical about a widthwise central axis of the media film grating, each of the media film strips is rectangular and parallel with each other, in this order from the widthwise central axis to each widthwise side of the media film grating, widths of the media film strips decrease, and widths of gaps between each two adjacent media film strips also decrease;
   wherein a coordinate axis "ox" is established, wherein the origin "o" is an intersecting point of the widthwise central axis and a widthwise direction of the planar waveguide, and "x" axis is the widthwise direction of the planar waveguide, boundaries of the media film strips are set to conform condition formulae:

$$x_n = \sqrt{\frac{\ln\left(1-\frac{n\pi}{a}\right)}{k}},$$

and $x_n>0$, wherein $x_n$ is the nth boundary of the media film strips along the "x" axis, and a and k are constants.

2. The method of claim 1, wherein the step of providing the planar waveguide comprises:
   providing a substrate comprising the top surface and a sidewall coplanar with the side surface;
   depositing a layer of titanium on the top surface; and
   diffusing the titanium into the top surface using a high temperature diffusion process to form the planar waveguide.

3. The method of claim 1, wherein the substrate is made of lithium niobate crystal.

4. The method of claim 1, wherein the high refractive index material is a high refractive index polymer.

5. The method of claim 1, wherein the media film grating is a chirped grating.

* * * * *